(12) United States Patent
Cox

(10) Patent No.: US 6,220,610 B1
(45) Date of Patent: Apr. 24, 2001

(54) CARRIER FOR A PORTABLE FOUNTAIN AND A WASTE RECEPTACLE

(75) Inventor: Lem L. Cox, New Braunfels, TX (US)

(73) Assignee: Alert Services, Inc., San Marcos, TX (US)

( * ) Notice: Subject to any disclaimer, the term of this patent is extended or adjusted under 35 U.S.C. 154(b) by 0 days.

(21) Appl. No.: 09/321,414

(22) Filed: May 28, 1999

Related U.S. Application Data

(60) Provisional application No. 60/087,113, filed on May 29, 1998.

(51) Int. Cl.⁷ ........................................................ B62B 1/26
(52) U.S. Cl. ................................... 280/47.19; 280/47.26; 280/47.35
(58) Field of Search .................... 280/30, 47.19, 280/47.26, 47.2, 47.24, 47.33, 47.34, 47.35, 47.17, 651, 652, 655, 655.1

(56) References Cited

U.S. PATENT DOCUMENTS

| | | | |
|---|---|---|---|
| 2,778,515 | * | 1/1957 | Hanson ............................. 280/47.19 |
| 3,997,181 | * | 12/1976 | Jaco et al. ......................... 280/47.19 |
| 4,936,594 | * | 6/1990 | Oliver, III ......................... 280/47.19 |
| 4,998,743 | * | 3/1991 | Thielen ............................. 280/47.26 |
| 5,159,777 | * | 11/1992 | Gonzalez ............................. 43/54.1 |
| 5,203,815 | * | 4/1993 | Miller ................................ 43/21.2 |
| 5,333,885 | * | 8/1994 | Pullman ............................ 280/47.19 |
| 5,579,968 | * | 12/1996 | Staschiak ............................. 224/274 |
| 5,839,739 | * | 11/1998 | Shannon et al. .................. 280/47.35 |
| 5,944,333 | * | 8/1999 | Kent .................................... 280/204 |
| 5,947,491 | * | 9/1999 | Meier ................................. 280/47.2 |
| 6,047,866 | * | 4/2000 | Brown .................................. 222/608 |

* cited by examiner

Primary Examiner—Brian L. Johnson
Assistant Examiner—Bridget Avery
(74) Attorney, Agent, or Firm—Jackson Walker L.L.P.

(57) ABSTRACT

A carrier for a gravity discharge, liquid reservoir is provided with a waste receptacle beneath the reservoir. The reservoir and receptacle are mounted to a mobile tubular frame. An upper shelf spans the space between the legs of the frame and supports the reservoir. A security strap is extensible across the front of the reservoir and around the front legs of the frame. Retaining brackets attach the receptacle to the frame.

2 Claims, 1 Drawing Sheet

CARRIER FOR A PORTABLE FOUNTAIN AND A WASTE RECEPTACLE

BACKGROUND OF THE INVENTION

This application claims priority to U.S. Provisional Application Serial No. 60/087,113, filed May 29, 1998.

The present invention relates to a carrier for a portable fountain or liquid dispenser and a waste receptacle.

Currently transporting water or other electrolytes to an athletic field or other location remote entails separately carrying the water cooler, cups, and a waste receptacle. The present invention reduces the handling and effort involved in moving these items to the field. Further, when a water cooler is used inside a facility, there is often a messy spillage from the gravity feed discharge spout of the cooler which requires clean up. The present invention provides a catch basis (or waste receptacle) directly beneath the cooler discharge to catch spillage and to retain solid waste such as papers and cups. The waste receptacle may be easily removed from its special holder bracket for use away from the carrier.

SUMMARY OF THE INVENTION

The present invention is a carrier for a liquid reservoir or cooler and a waste receptacle. An upper shelf supports the cooler while brackets hold the receptacle on a lower horizontal support extending between the front legs of the carrier. Two large wheels are attached to the back legs of the carrier and are joined by a common axle. Cup holders are removably attached to the carrier on opposite sides of the carrier.

DETAILED DESCRIPTION OF THE PREFERRED EMBODIMENT

Figure 1:
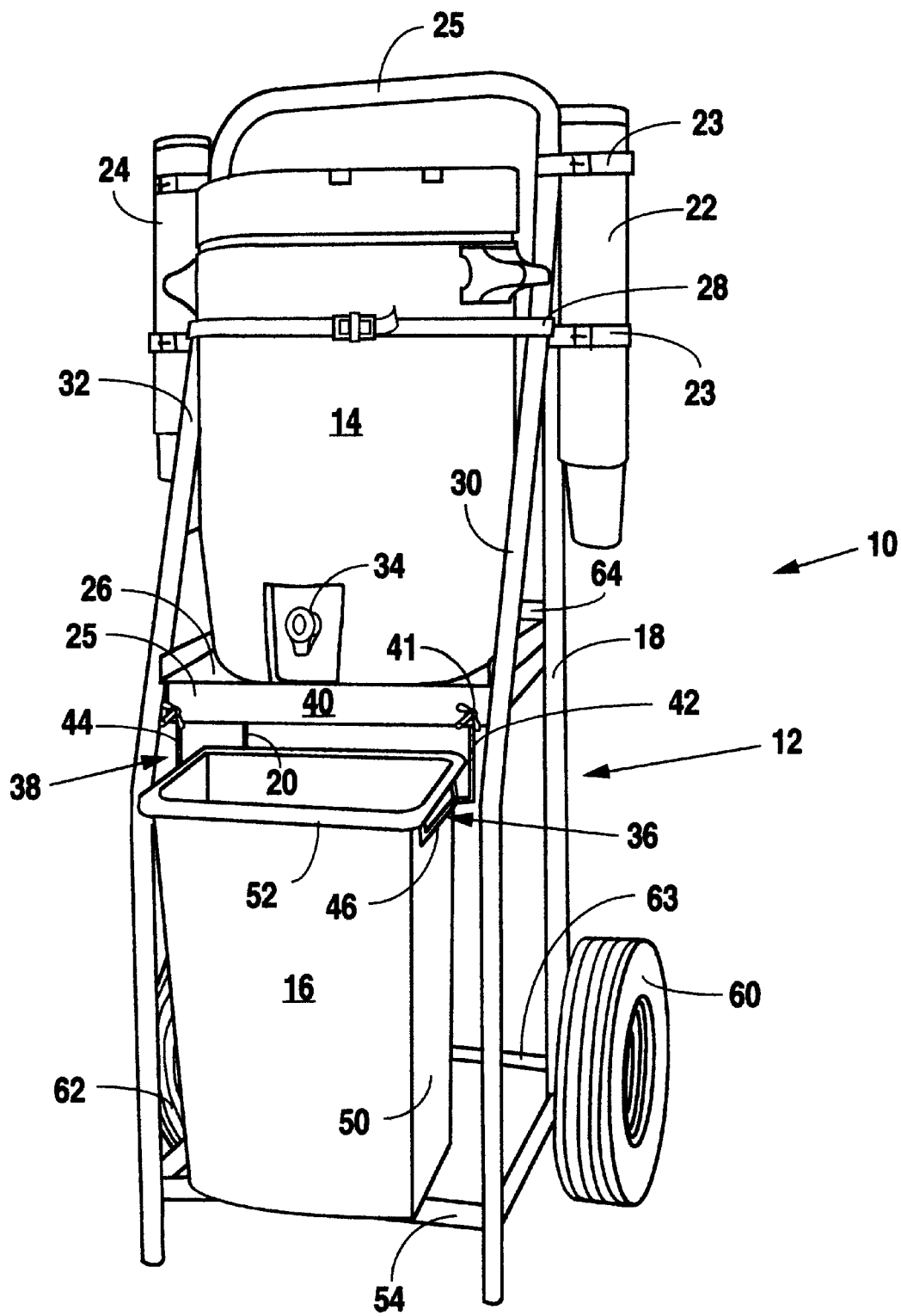
FIG. 1 illustrates a perspective of the present invention.

FIG. 1 shows the present invention 10 with a tubular carrier frame 12, a cooler 14, and a waste receptacle 16. Along opposite sides of the carrier frame 12 and attached to the downwardly extending back legs 18 and 20 are cup holders 22 and 24. The cup holders are releasably retained to the frame 12 by adjustable straps 23. Alternatively they may be attached by a clamp, bracket or other fastener. A handle 25 is provided at the top end of the carrier 16.

The cooler 14 rests on an upper shelf 26 which spans the space between the four legs. Cooler 14 is retained by strap 28 extending around the front of the cooler and across the front legs 30 and 32 of the carrier. A chain not shown in FIG. 1 extends between the back legs 18 and 20 behind the cooler. The chain secures the cooler on the shelf and facilitates removal of the cooler.

A gravity feed discharge spout 34 extends forward of the front edge 25 of shelf 26 so that drips or spills will fall into waste receptacle 16 attached to the carrier 12 by brackets 36 and 38.

The front of shelf 26 is provided with a face plate 40. Brackets 36 and 38 extend through openings 41 in the face plate 40 when attached to the carrier. Bracket legs 42 and 44 extend downwardly and are attached to side clamps 46 which urge against the side walls 50 of the receptacle 16 and slide under receptacle lip 52 to hold the receptacle 16 in place on front horizontal support 54 of the carrier 12.

The carrier 12 with cooler 14, receptacle 16, and cup holders 22 and 24 is transportable across uneven terrain by tilting the carrier back on to 10" pneumatic wheels 60 and 62. Wheels 60 and 62 are joined by a common axle 63 which extends through back legs 18 and 20. An upwardly extending back wall 64 on the upper shelf 26 keeps the cooler 14 from sliding off of the shelf when the carrier is tilted backwardly onto the wheels 60 and 62.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

What is claimed is:

1. A combination carrier, liquid reservoir and a waste receptacle, said receptacle having outer side walls and a lip along a central opening in said receptacle, comprising:

a tubular frame having a handle, two front legs and two back legs spaced apart from each other and extending downwardly from said handle;

first and second wheels attached to said back legs and joined by a common axle;

an upper frontwardly extending shelf spanning the space between said legs at an upper end of said carrier, said shelf having an upwardly extending back wall and a downwardly extending front face plate;

a security strap extensible across a front of said liquid reservoir and around said front legs when said reservoir is resting on said shelf;

two receptacle retaining brackets releasably attachable to said front face plate of said shelf and engageable against said outer side walls of said receptacle and beneath said lip, said receptacle resting on a horizontal support extending between said front legs at a bottom portion of said carrier.

2. The carrier of claim 1 further comprising cup holders releasably attached to said back legs near said handle.

* * * * *